(12) United States Patent
Erlmann et al.

(10) Patent No.: US 7,731,592 B2
(45) Date of Patent: Jun. 8, 2010

(54) FIXATION ARRANGEMENT FOR BEARING BUSHINGS ON A UNIVERSAL JOINT YOKE

(75) Inventors: Nikolaus Martin Erlmann, Düsseldorf (DE); Thomas Stein, Essen (DE)

(73) Assignee: Spicer Gelenkwellenbau GmbH, Essen (DE)

( * ) Notice: Subject to any disclaimer, the term of this patent is extended or adjusted under 35 U.S.C. 154(b) by 676 days.

(21) Appl. No.: 11/589,462

(22) Filed: Oct. 30, 2006

(65) Prior Publication Data

US 2007/0111805 A1    May 17, 2007

(30) Foreign Application Priority Data

Nov. 17, 2005    (DE)    ......... 10 2005 055 397

(51) Int. Cl.
*F16D 3/40*    (2006.01)
(52) U.S. Cl. .................................... 464/130
(58) Field of Classification Search ......... 464/128–130; 411/517, 518
See application file for complete search history.

(56) References Cited

U.S. PATENT DOCUMENTS

| | | | | |
|---|---|---|---|---|
| 1,993,357 A | * | 3/1935 | Braun et al. | ............... 464/130 |
| 2,773,368 A | | 12/1956 | Slaght | |
| 3,062,026 A | | 11/1962 | Pitner | |
| 4,692,079 A | * | 9/1987 | Killian et al. | ............ 411/517 X |
| 5,417,613 A | * | 5/1995 | Aiken | ......................... 464/130 |
| 6,113,306 A | * | 9/2000 | Allert | ..................... 411/518 X |
| 7,140,968 B2 | | 11/2006 | Gille et al. | |
| 2004/0127296 A1 | | 7/2004 | Gille et al. | |

FOREIGN PATENT DOCUMENTS

| | | | |
|---|---|---|---|
| CH | 358697 | | 1/1952 |
| CH | 358633 | * | 1/1962 |
| DE | 3527053 A1 | | 2/1986 |
| DE | 3446456 C1 | | 6/1986 |
| EP | 657659 | | 6/1995 |
| GB | 428272 | | 5/1935 |
| GB | 848715 | * | 9/1960 |

OTHER PUBLICATIONS

English language translation of DE 826 529.
English language translation of FR 2 568 962.

* cited by examiner

*Primary Examiner*—Greg Binda
(74) *Attorney, Agent, or Firm*—MacMillan, Sobanski & Todd, LLC

(57) ABSTRACT

A universal joint yoke includes a yoke base and two yoke arms, each respectively having a through extending bearing bore, a circular arc groove having a center that is arranged on a bore axis or is off-set from the bore axis toward the yoke base, and at least one securing recess on the outer face. A separate securing element for each yoke arm has an engagement portion with an outer circumference that is adapted to the circular arc groove and engaging the same and at least one securing portion that projects from the securing element in the direction away from the center and that engages the at least one securing recess and that secures the securing element against rotation around the center. A securing device retains the securing elements on the universal joint yoke.

5 Claims, 8 Drawing Sheets

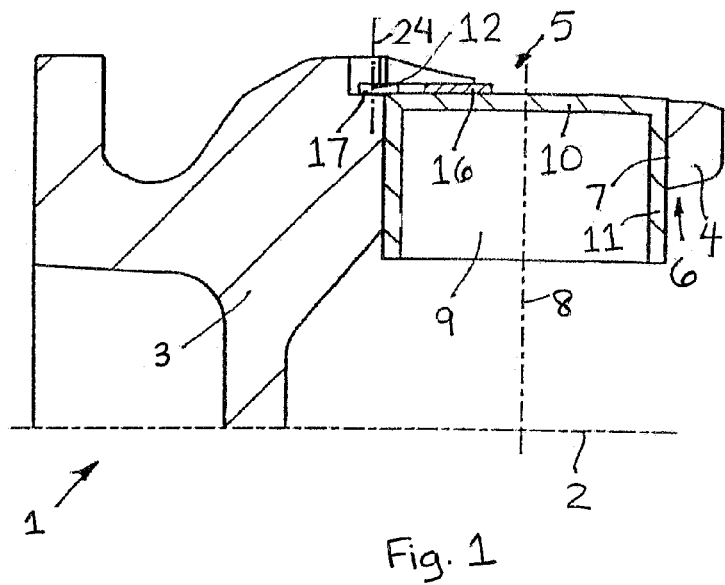
Fig. 1
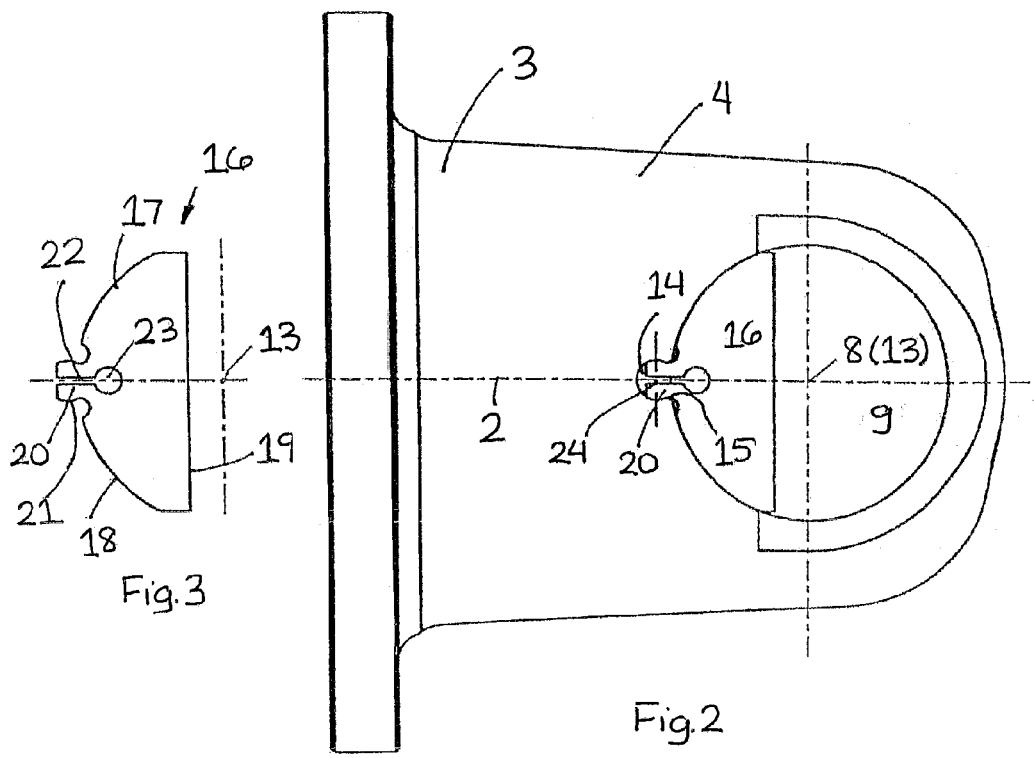
Fig. 3
Fig. 2

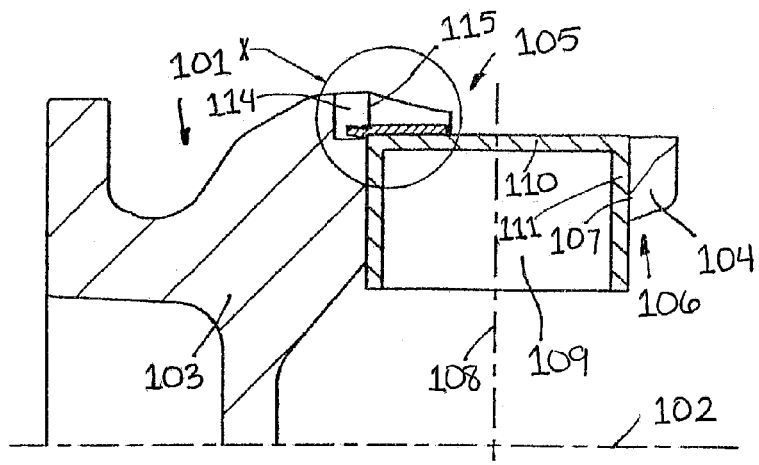
Fig. 4
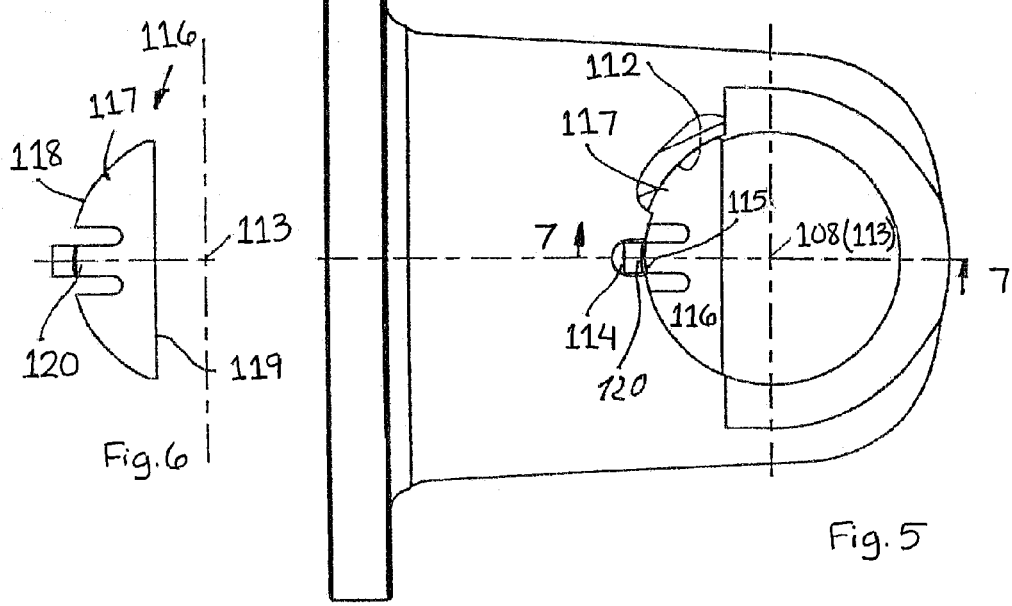
Fig. 6
Fig. 5
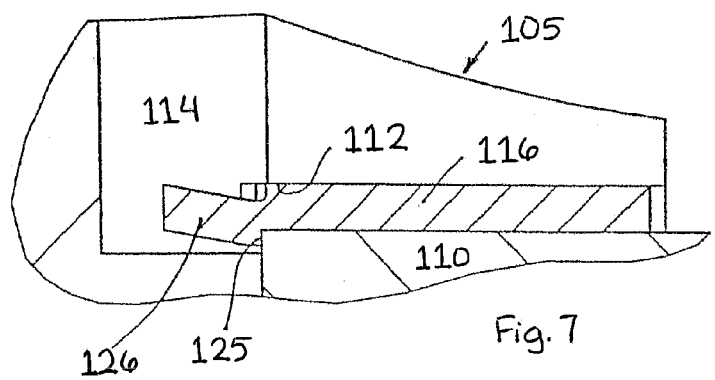
Fig. 7

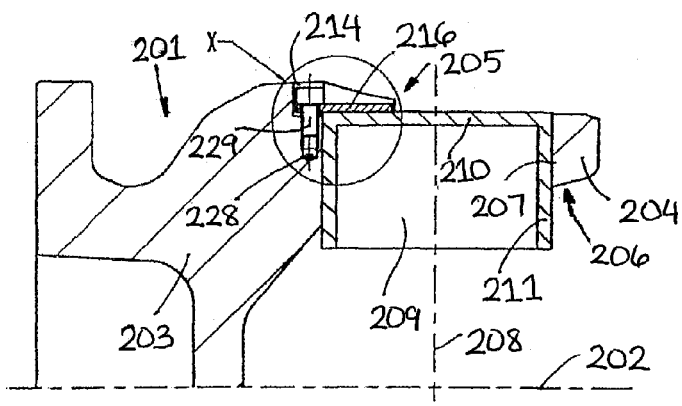
Fig. 8
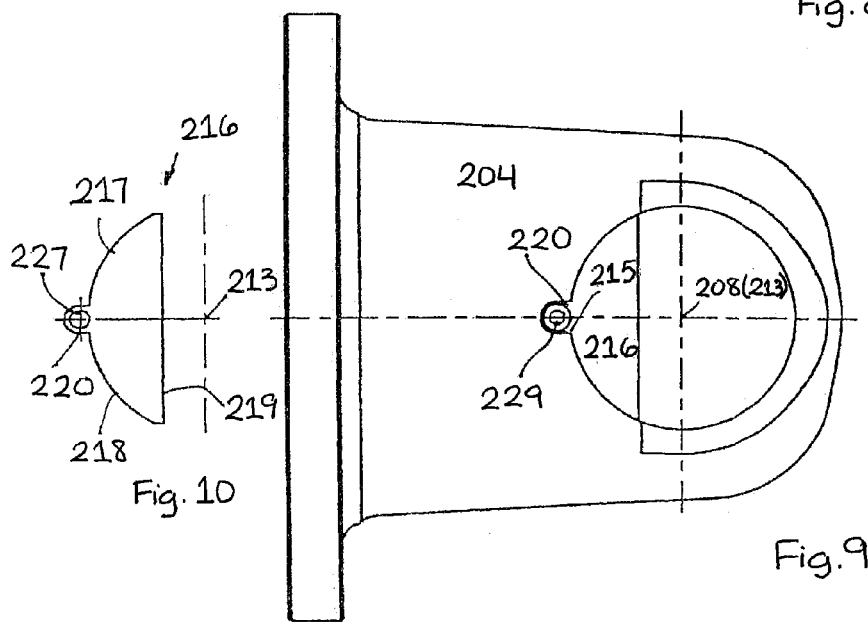
Fig. 10
Fig. 9
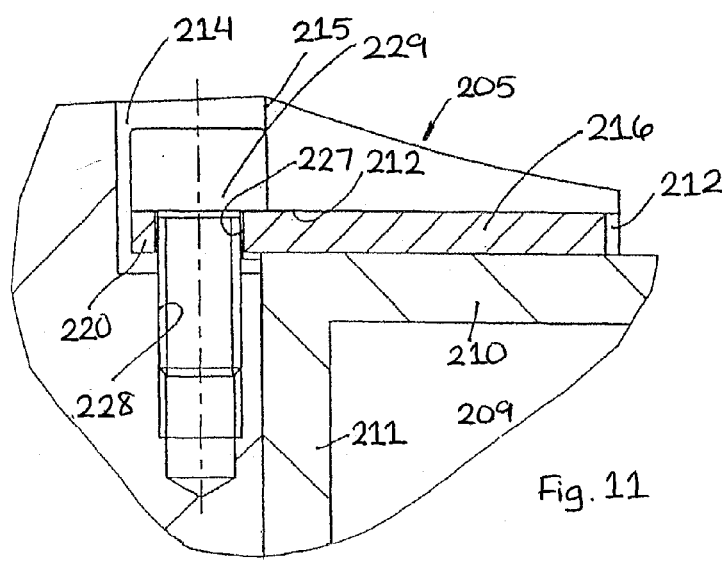
Fig. 11

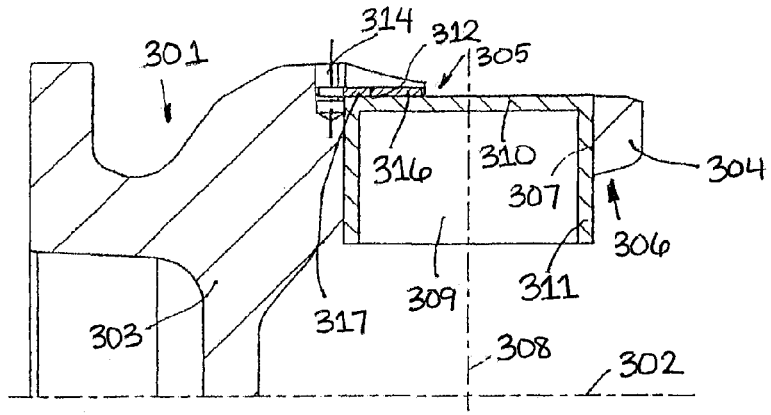
Fig. 12
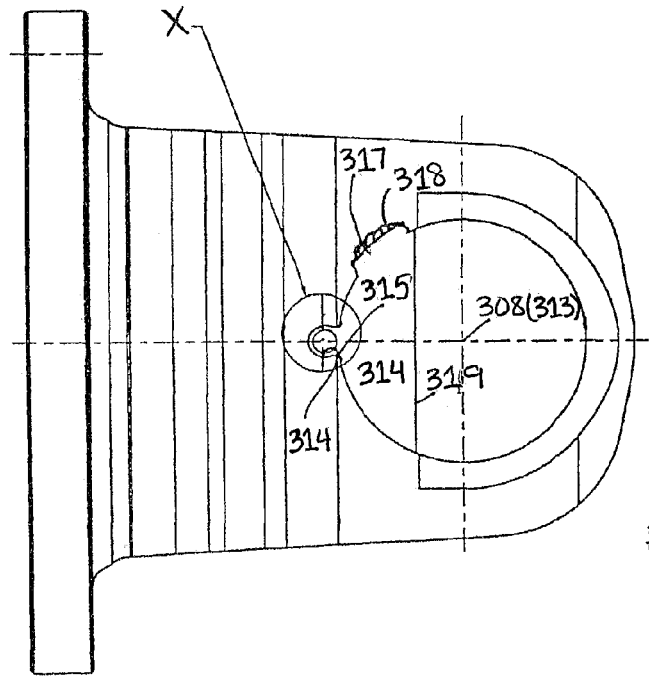
Fig. 13
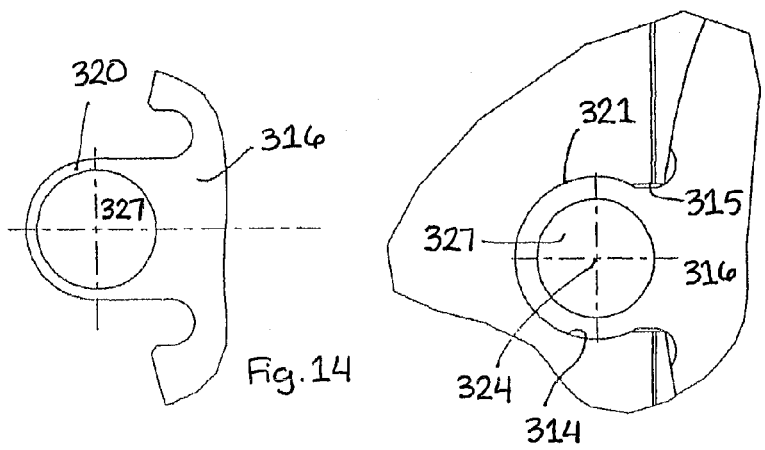
Fig. 14
Fig. 15

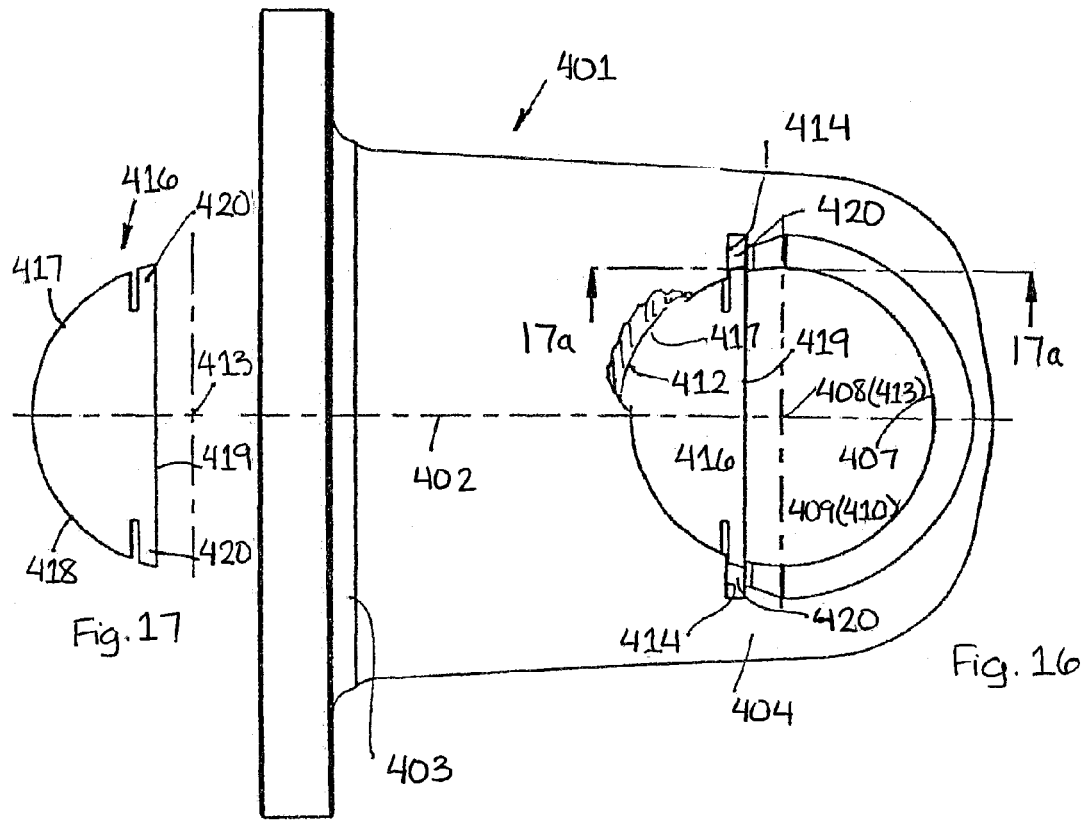
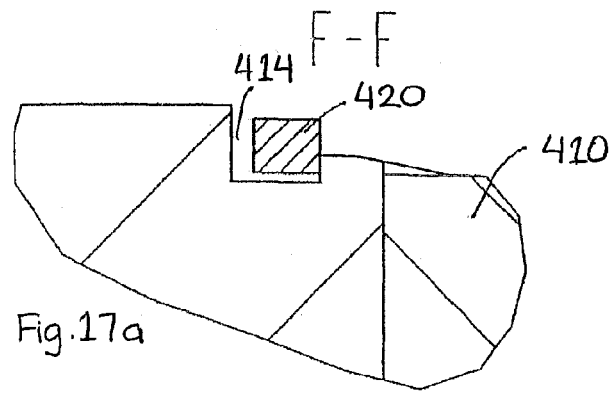

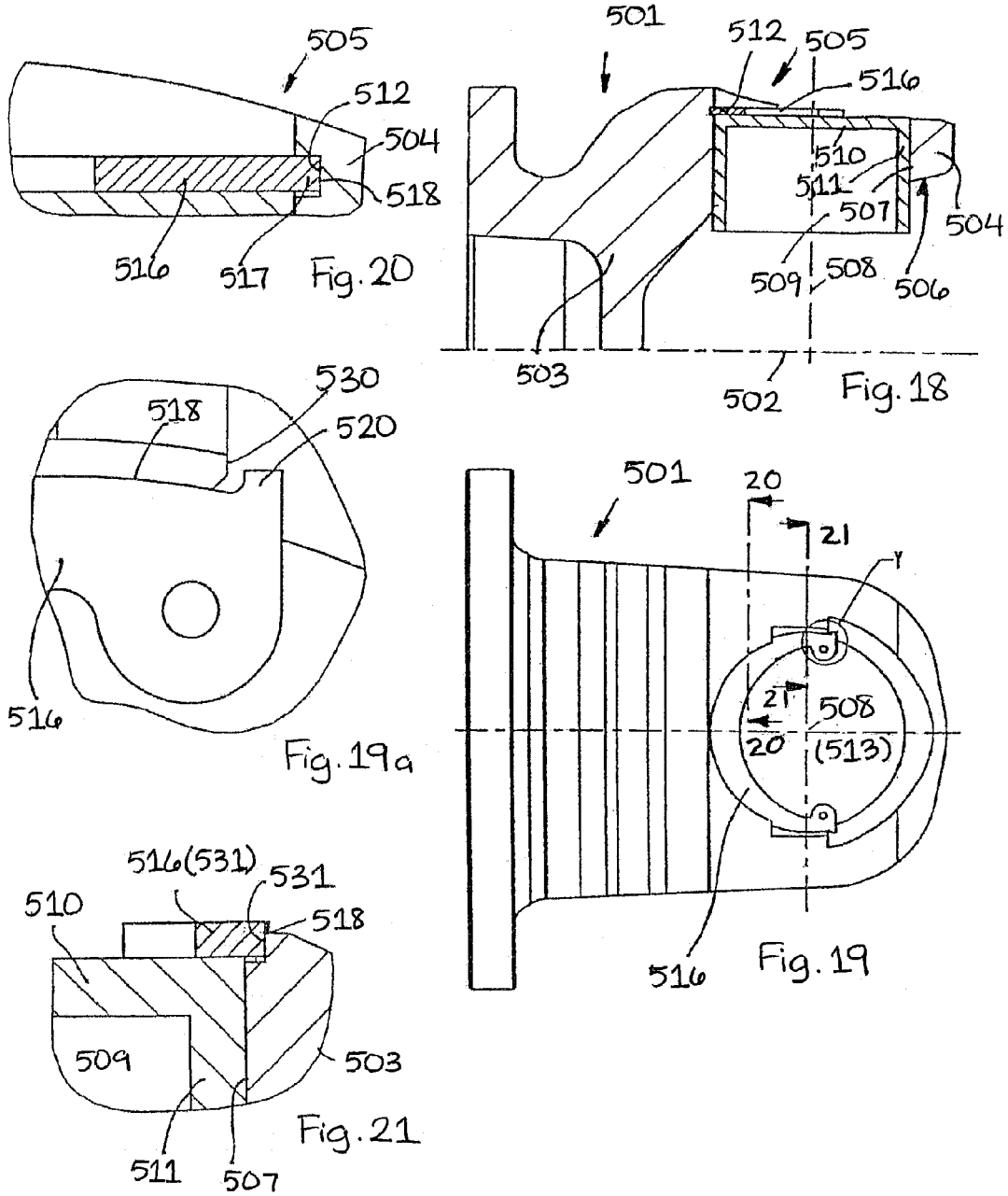

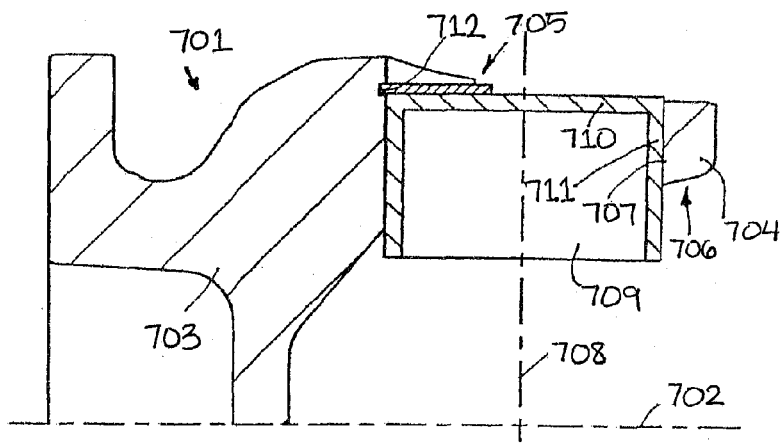
Fig. 24
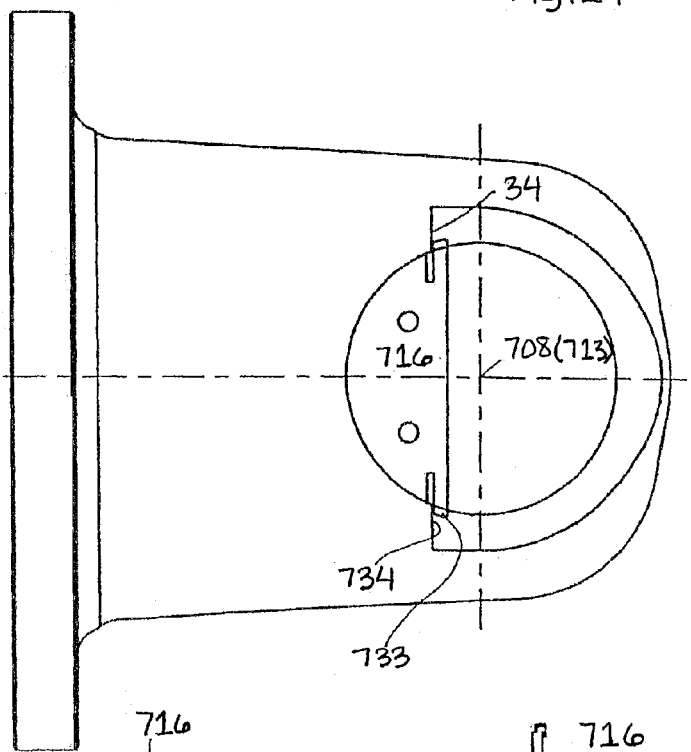
Fig. 25
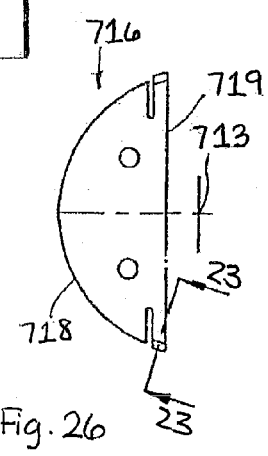
Fig. 26
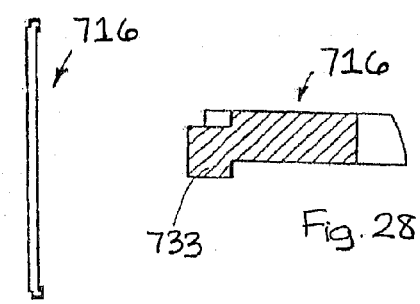
Fig. 27
Fig. 28

FIXATION ARRANGEMENT FOR BEARING BUSHINGS ON A UNIVERSAL JOINT YOKE

BACKGROUND OF THE INVENTION

The invention relates to a fixation arrangement for bearing bushings on a universal joint yoke.

From DE 102 61 114 A1, different fixation arrangements for bearing bushings on a universal joint yoke are known and include a universal joint yoke with a yoke base that defines a longitudinal axis. From the yoke base, two yoke arms project. The yoke arms extend diametrically offset from the longitudinal axis in the same direction from the yoke base. Each yoke arm has a through-extending bearing bore, wherein the bearing bores of both yoke arms are centered on a common bore axis that intersects the longitudinal axis at a right angle. The yoke arms each have, respectively, on an outer face facing away from the longitudinal axis and offset towards the yoke base when seen in a longitudinal sectional view containing the bore axis and facing the bearing bore, a circular arc groove. The center of the circular arc groove is arranged on the bore axis. The bearing bushing includes a bushing bottom and a circumferential wall. It is accommodated in the bearing bore of one yoke arm, wherein the bushing bottom faces towards the outside. On its outer face, the bushing bottom has a journal that projects outwardly beyond the bearing bore and is provided with a circumferentially extending groove, which center is arranged on the bore axis. A securing element is provided, which is formed like a kidney-shaped bow and has two portions that are elastically deformable towards each other and of which the outer portion engages in the circular arc groove and the inner portion engages in the groove of the journal at the bushing bottom. Alternatively, a securing element in form of a locking plate is provided that has an outer circumference which is adapted to the circular arc groove and engages in the same with an engagement portion. Furthermore, this securing element has a through bore, through which a screw can be inserted into a central bore in the bushing bottom. Alternatively, a plate-like securing element is proposed with an outer circumference that is adapted to the circular arc groove and is provided with a central through bore, wherein a journal, arranged to the bushing bottom, passes through this bore. The securing element is secured in its position by a securing ring, which engages in a groove of the journal at the bushing bottom. Additionally, in all embodiments, at the circumferential ends of the circular arc groove, abutments can be provided that secure the securing element against rotation.

The above-described securing arrangements necessitate measures and processing steps on the universal joint yoke, as well as on the bearing bushing. The journals, attached at the outside on the bushing bottom of the bearing bushing, or the attachment means, e.g. screws, however, enable that to a significant degree in front of the end of the yoke arms, which is distanced to the yoke base, a reduction of the rotational diameter of the universal joint yoke in the assembled condition of the bearing bushings is achievable, but, however, still necessitate, in many areas, a larger rotational diameter and, thus, limit also the maximum articulation angle.

SUMMARY OF THE INVENTION

The invention is based on the object to propose a fixation arrangement for bearing bushings on a universal joint yoke, in which the securing element can easily be mounted and, furthermore, further chances for the reduction of the rotational diameter are given.

This object is solved according to the invention by fixation arrangement for bearing bushings on a universal joint yoke comprising:
a universal joint yoke, having
a yoke base, forming a longitudinal axis,
two yoke arms, which
project, diametrically off-set from the longitudinal axis, in the same direction from the yoke base,
have, respectively, a through extending bearing bore, wherein the bearing bores of both yoke arms are centered on a common bore axis, which intersects at a right angle the longitudinal axis,
have, respectively, on an outer face facing away from the longitudinal axis and off-set towards the yoke base, when seen in a longitudinal sectional view containing the bore axis and facing the bearing bore, a circular arc groove having a center that is arranged on the bore axis or is off-set from the bore axis towards the yoke base, and
have, respectively, at least one securing recess on the outer face,
a separate securing element for each yoke arm, which
has an engagement portion with an outer circumference adapted to the circular arc groove and engaging the same, and
has at least one securing portion, which projects from the securing element in the direction away from the center, which engages the at least one securing recess and which secures the securing element against rotation around the center,
a securing means which retain the securing element on the universal joint yoke.

Of advantage in this arrangement is that the bushing bottom can be formed also along a significant portion in the direction towards the yoke base free from components to be attached thereto or to be supported on the same.

In an improvement of this first embodiment according to the invention, it is provided that a securing recess is provided towards the yoke base that is, starting from the bearing bore, undercut and forms, starting from the bearing bore, a passage. The securing element is formed disc-like and is retained with its securing portion form-fittingly in the securing recess, whereby the securing means are formed. By this arrangement, a rotational retainment and also a retainment against pulling-out is provided for the securing element. The assembly is simple. This is especially the case when it is provided that the securing portion is formed elastically transversally to the bore axis and, starting from the bearing bore, can deflect elastically when inserted through the passage into the securing recess.

Alternatively thereto, it is possible that the securing portion is dimensioned such that it can be inserted through the passage into the securing recess, and that the securing portion has a through bore, through which a tool for expanding the securing portion can be inserted, by means of which the securing portion is expanded to a size larger than the passage. Thus, a permanent securing is achieved. The detaching of this securing is only possible by means of destruction so that especially there, where no exchange of the bearing bushing should be possible or should remain in the hands of specialists, such an embodiment is advantageous.

In this case, the securing recess is formed over its circumference at least partially circular cylindrical. It has an axis that extends parallel to the bore axis. The elastic construction can be achieved such that the securing portion has a slot.

Alternatively, a securing recess is provided towards the yoke base that, starting from the bearing bore, is undercut-free. For this, it is provided that the securing element is formed disc-like and has a securing portion formed fittingly to the securing recess, and which engages with the same securing recess, starting from the bearing bore. To attach, in such a case, the securing element without the possibility of loosing it, it is provided that the securing portion has a through bore through which a screw, which engages in a threaded bore following the securing recess, is passed, whereby the securing means are formed. In such a case, it is also possible, however, that the securing recess and/or the bearing bushing form a retaining edge and that the securing portion has a projection that, starting from the bearing bore, engages behind the retaining edge, whereby the securing means are formed. Both solutions offer, besides the rotational retainment, a retainment against pulling-out for the securing element.

Instead of providing only one securing portion, it is also possible that the securing element is formed disc-like and has, at both ends of the engagement portion, securing portions in form of holding projections that, respectively, engage in a corresponding securing recess at the outer side of the mating yoke arm and form the securing means.

The object based on the invention is also solved by a fixation arrangement for bearing bushings on a universal joint yoke comprising:
  a universal joint yoke, having
  a yoke base, forming a longitudinal axis,
  two yoke arms that
    project diametrically off-set from the longitudinal axis in the same direction from the yoke base,
    have, respectively, a through extending bearing bore, wherein the bearing bores of both yoke arms are arranged on a common bore axis that intersects at a right angle the longitudinal axis,
    have, respectively, on an outer face facing away from the longitudinal axis and off-set to the yoke base, when seen in a longitudinal sectional view that contains the bore axis and facing the bearing bore, a circular arc groove having a center that is arranged on the bore axis or is off-set from the bore axis towards the yoke base, and
    have, respectively, at least one securing abutment on the outer face that is off-set from an imaginary plane on which the longitudinal axis is arranged perpendicularly and which contains the bore axis in direction away from the yoke base, and
  a separate securing element for each yoke arm that
    has an engagement portion with an outer circumference, which is adapted to the circular arc groove and engages the same, and
    has for each securing abutment a securing portion which is supported on the securing abutment.

In this case, also the advantages are achieved that were named in connection with the first solution according to the invention.

For a first embodiment of this solution according to the invention, it is provided that the securing portion of the securing element is formed as a projection that, in direction away from the yoke base, engages behind the mating securing abutment. In front of the securing abutment, a support face is arranged that follows the path of the circular arc groove beyond the imaginary plane up to the securing abutment. In a further embodiment of this proposal, it is provided that the securing abutment is formed by a step face, facing away from the bearing bore.

Alternatively, thereto, it is provided that the securing element has, following the ends of the portions of its outer circumference adapted to the circular arc groove, extended portions that form support edges extending parallel to the longitudinal axis, and which are supported on the faces representing the securing abutments and which extend parallel to the longitudinal axis and follow the ends of the circular arc groove.

A third solution of the object provides a fixation arrangement for bearing bushings on a universal joint yoke, comprising:
  a universal joint yoke, having
  a yoke base, forming a longitudinal axis,
  two yoke arms, which
    project diametrically off-set from the longitudinal axis in the same direction from the yoke base,
    have, respectively, a through extending bearing bore, wherein the bearing bores of both yoke arms are centered on a common bore axis that intersects at a right angle the longitudinal axis, and
    have, respectively, on an outer face facing away from the longitudinal axis and off-set towards the yoke base when seen in a longitudinal sectional view containing the bore axis and facing the bearing bore, a circular arc groove having a center that is arranged on the bore axis or is off-set from the bore axis towards the yoke base, and
  a separate securing element for each yoke arm, which
    is formed disc-like,
    has an outer circumference is adapted to the circular arc groove, and
    has, on the circumferential ends, bent holding projections that are supported on the abutment faces of the outer face portions having the circular arc groove, and, when seen from the yoke base, are, further, supported on the circumference of the bearing bushings in an area, which in front of a plane, containing the bore axis and on which the longitudinal axis is arranged perpendicularly.

Various objects and advantages of this invention will become apparent to those skilled in the art from the following detailed description of the preferred embodiments, when read in light of the accompanying drawings.

BRIEF DESCRIPTION OF THE DRAWINGS

FIG. 1 is a half longitudinal sectional view of a universal joint yoke with a first fixation arrangement according to the invention.

FIG. 2 is a plan view of FIG. 1.

FIG. 3 is a plan view of a securing element for the use in connection with the embodiment of FIGS. 1 and 2 as an individual component.

FIG. 4 is a half longitudinal sectional view of a universal joint yoke with a second fixation arrangement according to the invention.

FIG. 5 is a plan view of FIG. 4.

FIG. 6 is a plan view of a mating securing element for use in connection with the embodiment of FIGS. 4 and 5 as an individual component.

FIG. 7 is an enlarged sectional view taken along line VII-VII of FIG. 5 for the detail X encircled in FIG. 4.

FIG. 8 is a half longitudinal sectional view of a universal joint yoke with a third fixation arrangement according to the invention.

FIG. 9 is a plan view of FIG. 8.

FIG. 10 is a plan view of a securing element for use in connection with the embodiment of FIGS. 8 and 9 as an individual component.

FIG. 11 is an enlarged view of the detail X of FIG. 8.

FIG. 12 is a half longitudinal sectional view of a universal joint yoke with a fourth fixation arrangement according to the invention.

FIG. 13 is a plan view of FIG. 12.

FIG. 14 is an enlarged plan view of a securing element for use in connection with the embodiment of FIGS. 12 and 13 as an individual component after deformation.

FIG. 15 is an enlarged view of the detail X of FIG. 13.

FIG. 16 is a plan view of a universal joint yoke with a fifth fixation arrangement according to the invention.

FIG. 17 is a plan view of a securing element for use in connection with the embodiment of FIG. 16 as an individual component.

FIG. 17a is an enlarged sectional elevational view of a portion of the universal joint illustrated in FIG. 16.

FIG. 18 is a half longitudinal sectional view of a universal joint yoke with a sixth fixation arrangement corresponding according to the invention.

FIG. 19 is a plan view of FIG. 18.

FIG. 19a is an enlarged detail Y of a portion of the universal joint yoke illustrated in FIG. 19.

FIG. 20 is an enlarged sectional elevational view taken along line XX-XX of FIG. 19.

FIG. 21 is an enlarged sectional elevational view taken along line XXI-XXI of FIG. 19.

FIG. 24 is a half longitudinal sectional view of a universal joint yoke with a seventh fixation arrangement according to this invention.

FIG. 25 is a plan view of FIG. 24.

FIG. 26 is a plan view of the securing element for use in connection with the embodiment of FIG. 25 as an individual component.

FIG. 27 is a side elevational view of the securing element of FIG. 26.

FIG. 28 is an enlarged sectional elevational view taken along line XXVII-XXVII of FIG. 26.

DETAILED DESCRIPTION OF THE PREFERRED EMBODIMENTS

Figure 22:
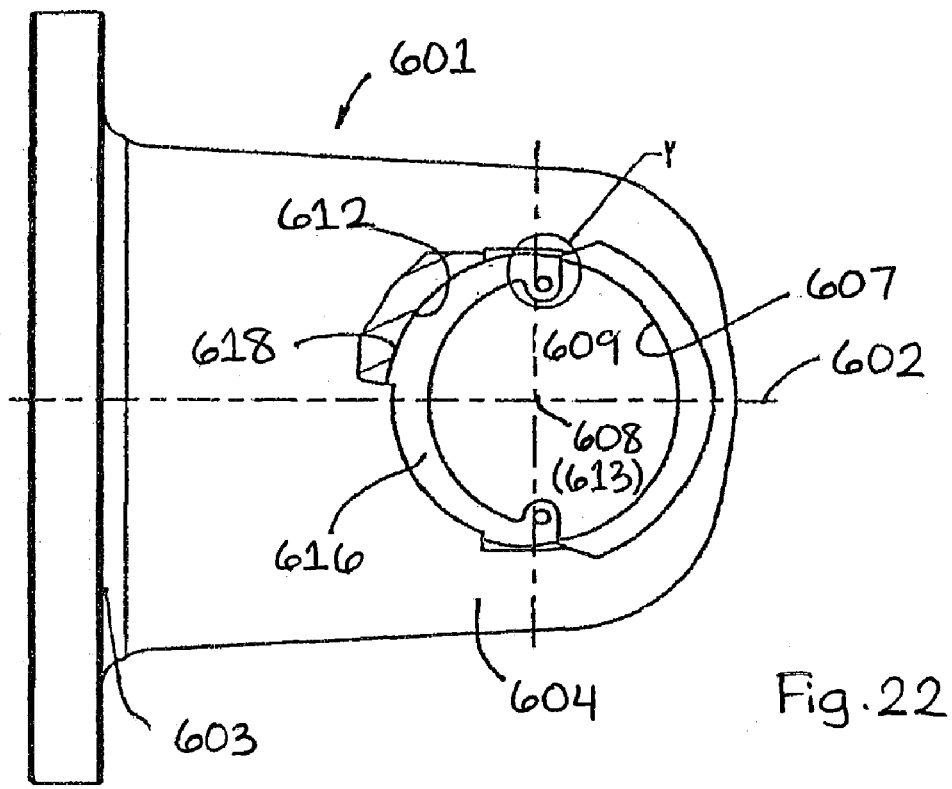
FIG. 22 is a plan view of a universal joint yoke with a seventh fixation arrangement corresponding according to the invention.

FIG. 1 illustrates a universal joint yoke 1, wherein only one half of the universal joint yoke 1 is visible and the longitudinal axis 2 represents the mirror symmetry axis. Starting from a yoke base 3, a pair of yoke arms 4 are provided that are diametrically off-set to the longitudinal axis 2 and project from the yoke base 3 in the same direction. The illustrated yoke arm 4 has an outer face 5, which faces away from the longitudinal axis 2, and an inner face 6, which faces toward the longitudinal axis 2. Between the outer face 5 and the inner face 6, a bearing bore 7 extends. The bearing bore 7 is centered on a bore axis 8. The bore axis 8 intersects at a right angle the longitudinal axis 2. A second yoke arm 4, not shown and diametrically opposed to the illustrated bearing arm 4, has also a bearing bore 7 that is also centered on the extension of the bore axis 8.

In the bearing bore 7, a bearing bushing 9 is accommodated. This bearing bushing 9 is, on one side, open toward the longitudinal axis 2 and, distanced thereto, is closed by a bushing bottom 10. The bearing bushing 9 also includes a circumferential wall 11, with which it rests in the bearing bore 7. This bearing bushing 9 serves to support a bearing journal (not shown) of a journal cross to connect two universal joint yokes to form one universal joint. In this connection, it is desirable to secure the bearing bushing 9 in radial direction relative to the longitudinal axis 2. For this purpose, a fixation arrangement according to the invention is provided.

On the outer face 5 of the yoke arm 4, a circular arc groove 12 is provided. The illustrated circular arc groove 12 extends over an arc of at least 180° around a center point 13. This center point 13 coincides, in the illustrated embodiment, with the bore axis 8. It can be seen that the circular arc groove 12 ends in front of a plane that contains the bore axis 8 and is arranged perpendicular to the longitudinal axis 2, i.e., when seen from the yoke base 3.

As shown in FIG. 2, starting from the bearing bore 7, a securing recess 14 is provided and extends in the direction towards the yoke base 3. The securing recess 14 is approximately centered on an radial plane relative to the longitudinal axis 2 and has an undercut. The illustrated securing recess 14 is formed as a circular cylindrical bore and defining an axis 24. Correspondingly, starting from the bearing bore 7, a passage 15 is provided that extends towards the securing recess 14 and is dimensioned smaller than the bore diameter that forms the securing recess 14.

A securing element 16 is provided for the axial retainment of the bearing bushing 9 in the bearing bore 7. The illustrated securing element 16 is formed as a disc and is especially visible as an individual component in FIG. 3. This disc-like securing element 16 has an outer circumference 18 that is formed semi-circular and arc-like corresponding to the circular arc groove 12. The portion of the securing element 16 that directly follows the outer circumference 18 forms an engagement portion 17 that enters the circular arc groove 12 of the universal joint yoke 1. The securing element 16 has, in a plan view, essentially the form of a segment of a circle with the outer circumference 18 and an end face 19. From the outer circumference 18, a securing portion 20 projects that, in the plan view shown in FIG. 3, has a circular circumferential face 21 that is adapted to the securing recess 14. Further, this securing portion 20 is divided by a central slot 22 into two portions. The slot 22 ends in a bore 23. Therefore, it follows that the two portions of the securing portion 20 can deform elastically toward each other. Thus, when the securing element 16 with its engagement portion 17 is inserted along the outer face of the bushing bottom 10 in a direction toward the yoke base 3, the securing portion 20 enters through the passage 15 the securing recess 16 arranged behind the passage. The two portions of the securing portion 20 initially elastically deform toward each other during the insertion through the passage 15 and subsequently deform elastically away from each other and thereby secure the securing element 16 in a double manner. The securing portion 20, in cooperation with the securing recess 14, serves for the axial retainment of the securing element 16 so that the securing element 16 cannot leave with its engagement portion 17 the circular arc groove 12. Furthermore, the cooperation of the securing portion 20 and the securing recess 14 also secure the same against rotation around the center 13. The center 13 does not have to coincide with the bore axis 8, but can alternatively be arranged off-set, such as in the direction toward the yoke base 3 on the longitudinal axis 2.

This embodiment is especially compact and allows an easy assembly and disassembly of the securing element 16. As it is especially apparent from FIG. 1, the radial dimensions, measured across the yoke arm 4, are even still there small where the securing element 16 is provided so that as a whole a small rotational circle is achieved, i.e., an especially compact design is achieved.

FIGS. 4 to 7 illustrate a variant to the embodiment of FIGS. 1 to 3. In this second embodiment, reference numerals for components or portions of components that have, for comparable components or portions of FIGS. 1 to 3, numerical values that are increased by the numerical value 100 to those of FIGS. 1 to 3. Thus, only the differences to the first embodiment illustrated in FIGS. 1 to 3 will be described. Concerning the description of the other parts, reference may be made to the description of corresponding parts in FIGS. 1 to 3.

In this second embodiment, only the securing recess 114 and the securing portion 120 of the securing element 116 are formed different to the design shown in FIGS. 1 to 3. Specifically, the securing recess 114 is formed without an undercut in the embodiment of FIGS. 4, 5 and 7. Thus, the securing portion 120 that, in the plan view, is nearly formed as a rectangular tongue can, without further measures being necessary, be inserted into the securing recess 114. The securing recess 114 is provided with essentially rounded rectangular, or at least with two parallel faces, through the passage 115. This means that the passage 115 is not increased in cross section when seen from the bearing bore 107. The securing recess 114 is therefore free of an undercut and, starting from the outer face 105, provided so deeply into the yoke arm 104 that it extends under the outer face of the bushing bottom 110 and is open in this area also towards the bearing bore 107.

The securing element 116 has a tongue-like securing portion 120 that, away from the center 113, is provided with a projection 126 directed toward the longitudinal axis 102. This projection 126 engages behind a retaining edge 125 that is formed by the outer face of the circumferential wall 111 of the bearing bushing 109. By means of inserting a tool under the securing portion 120 having the projection 126, this can be lifted so that the securing element 116 can be moved away from the yoke base 103 out of connection to the circular arc groove 112 and the securing recess 114.

In the following description of the embodiment of FIGS. 8 to 11, only a description of such parts or portions that are formed different to the embodiment of FIGS. 1 to 3 is given. Parts and portions that correspond to those of FIGS. 1 to 3 are not described separately but, for their description, it is referred to the corresponding components and portions in FIGS. 1 to 3. For ease of understanding, reference numerals have been selected for comparable components and portions in FIGS. 8 to 11 that, when compared to those comparable components and portions in FIGS. 1 to 3, are increased by the numerical value 200.

The third embodiment according to FIGS. 8 to 11 differs from that of FIGS. 1 to 3 also generally in the construction of the securing recess 214 and of the securing element 216, as well as the fixation of the same relative to the universal joint yoke 201. From FIG. 10, it can be seen that the securing element 216 is also formed as a disc that essentially corresponds to the form of a segment of a circle, wherein centrally from the outer circumference 218 of the securing element 216, a securing portion projects that is centrally provided with a through bore 27. The securing recess 214 is formed correspondingly, in which the securing portion 220, formed as a projection, engages when the securing element 216 is mounted to the universal joint yoke 201 so that when its outer circumference 218 and the engagement portion 217 attached thereto rest in the circular arc groove 212, it is retained in the rotational direction around the center 213. Additionally, a securing against pulling-out from the circular arc groove 212 is achieved such that through a through bore 227, a screw 229 is screwed into a threaded bore 228 in the base of the securing recess 214.

In a fourth embodiment illustrated in FIGS. 12 to 15, again only the differences that are achieved in relation to the embodiment of FIGS. 1 to 3 are described in detail. In this fourth embodiment, the components and portions corresponding generally to those of FIGS. 1 to 3 are provided with reference numerals that are increased by the numerical value 300 to those of FIGS. 1 to 3. For their description, it is referred to the description of FIGS. 1 to 3. The difference is based mainly on the construction of the securing element 316 and the fixation thereof in the securing recess 314.

The securing recess 314 is, as also described with the embodiment of FIGS. 1 to 3, formed with an undercut so that starting from the passage 315 in the direction to the yoke base 303, an enlargement is given. Through this passage 315, the securing portion 320 of the securing element 316 has to be inserted. This securing portion 320 is also provided in the form of a projection that has centrally a through bore 327. In this fourth embodiment, the outer circumference 321 and the dimensions transversally to the longitudinal axis 302 are selected such that the securing portion 320, when inserting the securing element 316 with its engagement portion 317 into the circular arc groove 312, also fits through the passage 315. Following thereto, by means of inserting an expanding tool into the through bore 327, a deformation of the securing portion 320 is achieved such, that the through bore 327 is enlarged and correspondingly the outer circumference 321 is changed such that it is adapted to the profile of the securing recess 314. Thus, a secure connection that is not detachable without destruction of the securing element 316 to the universal joint yoke 301 is achieved. The above-described embodiments of FIGS. 1 to 11 are all formed such that they can easily be detached, i.e., without having to destroy one of the components.

The fifth embodiment of FIGS. 16, 17, and 17a is also only described concerning the deviating features to the embodiment of FIGS. 1 to 3. The components and portions that correspond to those of FIGS. 1 to 3, are provided in the fifth embodiment of FIGS. 16, 17, and 17a with reference numerals that, compared to those of FIGS. 1 to 3, are increased by the numerical value 400. For their description, it is referred to the corresponding description of FIGS. 1 to 3.

While in the embodiment of FIGS. 1 to 3, one single securing portion, centered centrally on the longitudinal axis, is provided, in the fifth embodiment of FIGS. 16, 17, and 17a, two securing portions are provided that are arranged toward the end face 419 and that project beyond the outer circumference 418 of the securing element 416. Correspondingly, in the universal joint yoke 401, two securing recesses 414 are provided, into which respective securing portions 420 engage. The assembly is done such that initially, the securing portions 420 are bent, i.e., in FIG. 16, they would project upwards out of the drawing plane. Only after the assembly, a bending of the same is carried out so that they engage the securing recesses 420 and take up the position then, as it is shown in FIGS. 16 and 17. The two securing portions 420, in connection with the securing recesses 414, provide an axial retainment of the securing element 418 against pulling out from the circular arc groove 412, as well as a rotational retainment around the center 413 that represents the base, around which the circular arc, forming the outer circumference 418, extends.

In the sixth embodiment of the fixation arrangement shown in FIGS. 18 to 21, the components and portions that correspond to those of FIGS. 1 to 3, are provided with reference numerals that are, compared to those of FIGS. 1 to 3, increased by the numerical value 500. For their description, it is referred to the description of FIGS. 1 to 3. Following, however, the differences are described in more detail, which are achieved by the deviating construction of the securing element 516 compared to those of FIGS. 1 to 3.

The securing element 516 is formed generally in the shape of a sickle. At the ends of the circular arc groove 512, beyond the plane that is both perpendicular to the longitudinal axis 502 and that contains the bore axis 508, circular arc-like support faces 531 are provided. A securing abutment 530 is provided at the end of the arc-like support faces 531, to which the securing portion 520 of the securing element 516 abuts, so that a rotational retainment is achieved. The securing against pulling-out is achieved by abutment of the outer circumference 518 of the securing element 516 with the support faces 531 that extend from the yoke base 503 as a circular arc beyond the plane, defined beforehand.

It is especially visible in FIGS. 19, 19a, that the securing element 516, with the securing portions 520 in form of projections, is extended beyond an imaginary plane that is both perpendicular to the longitudinal axis 502 and that contains the bore axis 508, away from the yoke base 503. As a result, a securing against pulling-out and a rotation is achieved for the securing element 516.

Figure 23:
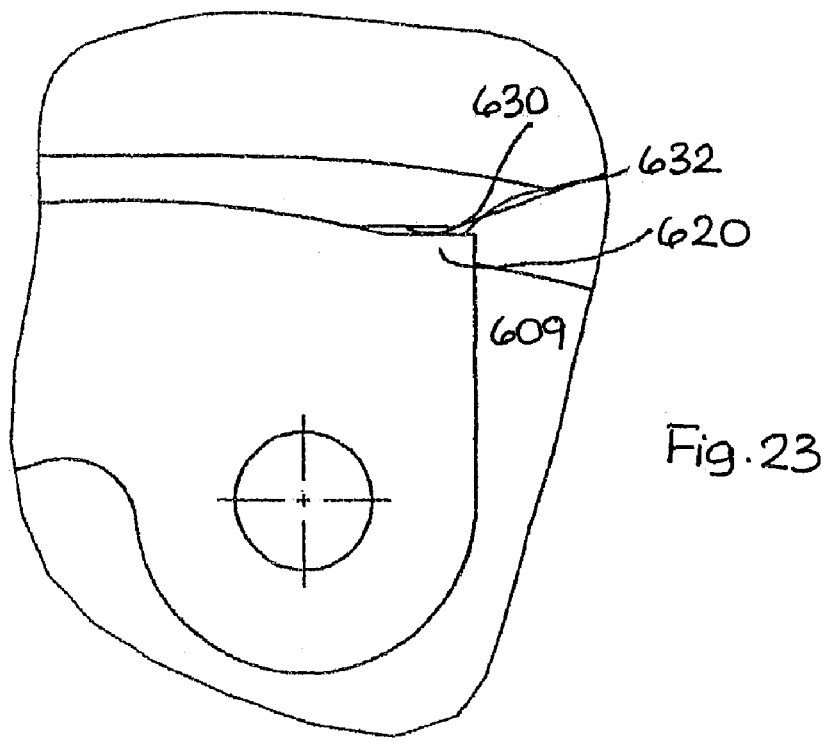
FIG. 23 is an enlarged detail Y of a portion of the universal joint yoke illustrated in FIG. 22.

In a seventh embodiment of the fixation arrangement illustrated in FIGS. 22 and 23, the embodiment is changed compared to the embodiment of FIGS. 18 to 21, wherein FIG. 22 shows a plan view of a yoke arm 604 and FIG. 23 shows the detail Y in an enlarged scale. Essentially, the seventh embodiment of FIGS. 22 and 23/ corresponds concerning the base construction to that of FIGS. 1 to 3, wherein for comparable components and portions reference numerals are selected that, compared to those of FIGS. 1 to 3, are increased by the numerical value 600. It can be seen that the securing element 616 is also formed having a sickle-like shape. This securing element 615 is also accommodated in the circular arc groove 612 that is extended corresponding to FIGS. 18 to 21 beyond the plane containing the bore axis 608, wherein, however, following to the circular arc groove 612 on the universal joint yoke 601 in the direction away from the yoke base 603, faces are provided. The faces are arranged parallel to each other and extend towards the longitudinal axis 602 that form the abutments 603. Correspondingly, the securing element 616 is provided following to the ends of its portion of its outer circumference 618, adapted to the circular arc groove 612, with extension portions that form support edges 632 extending parallel to the longitudinal axis 602. With these, the securing element 616 is supported on the abutments 630 for the rotational retainment.

An eighth embodiment is shown in FIGS. 24 to 28. In this eighth embodiment, the components and portions that are comparable to those of the embodiment of FIGS. 1 to 3 are provided with reference numerals that are increased by the numerical value 700 to those of FIGS. 1 to 3. For their description, it is again referred to the description of FIGS. 1 to 3.

The securing element 716 is formed as a disc with an outer circumference 718 and an end face 719 that approximate a segment of a circle. The securing element 716 has, however, towards the end face 719 following the circumferential ends of the outer circumference 718, holding projections 733 that, corresponding to FIG. 28, extend and projecting from the drawing plane. The portion of the outer face 705 of the universal joint yoke 701, having the circular arc groove 712, ends at the circumferential ends of the same with abutment faces 734. Further, in connection with FIG. 28, it can be seen that the holding projections 733 form portions of small arms that are only partially connected with the securing element 716, so that the holding projections 733 are elastically deformable. In the assembly of the securing element 716, an insertion of the same along the bushing base 710 in the direction towards the yoke base 703 takes place so that the outer circumference 718 can enter the circular arc groove 712. In this case, the holding projections 733 are still supported on the bushing base 710 and an elastic deformation of the portions, holding these on the securing element 716, is achieved such that the securing element 716, with its outer circumference 718, can enter the circular arc groove 712. As soon as a portion of the bearing bushing 709 is reached, which is arranged in front of the plane that contains the bore axis 708 and on which the longitudinal axis 702 is arranged perpendicularly, when seen from the yoke base 703, the holding projections 733 can, as the bushing base 710 is out of the way, elastically deform back in the direction towards the longitudinal axis 702 and can abut the outer circumference of the circumferential wall 711 of the bearing bushing 709. At the same time, they abut the abutment faces 734 on the outer face 705 of the universal joint yoke 701. Thus, a rotational retainment and a retainment against detachment of the securing element 716 out off the circular arc groove 712 is achieved.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:
1. A fixation arrangement for bearing bushings on a universal joint yoke comprising:
  a universal joint yoke including a yoke base forming a longitudinal axis and two yoke arms that project diametrically off-set from the longitudinal axis in the same direction from the yoke base, each of the yoke arms respectively having (1) an outer face, (2) a through extending bearing bore, wherein the bearing bores of the two yoke arms are arranged on a common bore axis that intersects the longitudinal axis at a right angle, (3) a circular arc groove on the outer face facing away from the longitudinal axis and off-set to the yoke base when seen in a longitudinal sectional view containing the bore axis and facing the bearing bore, wherein the center of the circular arc groove is arranged on the bore axis or is off-set from the bore axis toward the yoke base, and (4) at least one securing abutment on the outer face that is off-set from an imaginary plane that is both perpendicular to the longitudinal axis and that contains the bore axis in a direction away from the base,
  a separate sickle-shaped securing element for each yoke arm, each of the sickle-shaped securing elements having an engagement portion with an outer circumference that engages the circular arc groove, wherein each of the sickle-shaped securing elements includes at least one securing portion that is provided at the end of the engagement portion thereof and that is supported on the at least one securing abutment.

2. The fixation arrangement defined in claim 1 wherein each of the yoke arms respectively have two securing abutments on the outer face that are off-set from the imaginary plane, and wherein each of the securing elements includes two securing portions that are provided at the respective ends of the engagement portion of the securing element and that are respectively supported on the two securing abutments.

3. The fixation arrangement defined in claim 1 wherein the securing portion of each of the securing elements is formed as a projection that engages the respective securing abutment.

4. The fixation arrangement defined in claim 1 wherein at the end of the circular arc groove an arc-like support face is provided that extends beyond the imaginary plane to the securing abutment.

5. The fixation arrangement defined in claim 1 wherein the securing abutment is formed by a step face.

* * * * *